United States Patent
Milijevic et al.

(10) Patent No.: US 8,090,316 B2
(45) Date of Patent: Jan. 3, 2012

(54) DIGITAL FM RADIO TRANSMITTER

(75) Inventors: Slobodan Milijevic, Ottawa (CA); Krste Mitric, Ottawa (CA)

(73) Assignee: Microsemi Semiconductor Corp., Kanata, ON (CA)

( * ) Notice: Subject to any disclaimer, the term of this patent is extended or adjusted under 35 U.S.C. 154(b) by 690 days.

(21) Appl. No.: 12/207,686

(22) Filed: Sep. 10, 2008

(65) Prior Publication Data

US 2009/0081969 A1   Mar. 26, 2009

(30) Foreign Application Priority Data

Sep. 24, 2007 (GB) .................................. 0718492.2

(51) Int. Cl.
*H04B 7/00* (2006.01)

(52) U.S. Cl. ......... 455/41.2; 455/42; 455/45; 455/114.2

(58) Field of Classification Search ................. 455/41.2, 455/42, 45, 114.2
See application file for complete search history.

(56) References Cited

U.S. PATENT DOCUMENTS

| 5,905,388 | A  | * | 5/1999  | Van Der Valk et al. ....... 327/107 |
|-----------|----|---|---------|--------------------------------------|
| 6,560,447 | B2 |   | 5/2003  | Rahman et al.                        |
| 7,071,792 | B2 | * | 7/2006  | Meck .............................. 333/32 |
| 2001/0000313 | A1 | * | 4/2001 | Zhang ................................ 381/7 |
| 2001/0027092 | A1 | * | 10/2001 | Muschallik et al. .......... 455/260 |
| 2002/0191727 | A1 |   | 12/2002 | Staszewski et al.                    |
| 2005/0195917 | A1 |   | 9/2005  | Staszewski et al.                    |
| 2005/0258908 | A1 | * | 11/2005 | Mitric ............................. 331/16 |
| 2006/0033582 | A1 |   | 2/2006  | Staszewski et al.                    |
| 2007/0085623 | A1 |   | 4/2007  | Staszewski et al.                    |
| 2008/0231381 | A1 | * | 9/2008  | Reddy .......................... 331/1 A |

FOREIGN PATENT DOCUMENTS

DE   10308921 A1   9/2004
WO   2004/062087 A1   7/2004

\* cited by examiner

*Primary Examiner* — Tuan H Nguyen
(74) *Attorney, Agent, or Firm* — Marks & Clerk; Richard J. Mitchell

(57) ABSTRACT

A digital FM transmitter has a digital controlled oscillator for generating a modulated RF carrier. A digital signal processor receives digital input samples and generates a modulating signal for input to the digital controlled oscillator. A bandpass filter for filters frequency components of the modulated carrier outside a predetermined frequency band and supplies the filtered modulated RF carrier to an antenna.

18 Claims, 3 Drawing Sheets

DIGITAL FM RADIO TRANSMITTER

FIELD OF THE INVENTION

This invention relates to the field of digital frequency modulation (FM), and in particular to a digital FM radio transmitter.

BACKGROUND OF THE INVENTION

In OEM bluetooth hands-free car kit applications, a bluetooth transceiver/voice processor is usually pre-wired to car stereo speakers. However, in aftermarket applications, either the car electronic system has to be modified or an additional speaker has to be placed in the car. Both these methods are cumbersome as they generally have to be performed by a qualified car-electronic technician. To avoid this problem, some bluetooth hands-free car kit manufacturers use a short range FM transmitter to broadcast voice and music from the bluetooth hands-free car kit to the car stereo. This solution uses one of many off-the-shelf FM transmitters.

Such transmitters are based on analog technology where the carrier frequency is changed by changing a capacitance of an LC oscillator (L-inductor, C-capacitor). The capacitance of the LC oscillator is changed by changing the bias voltage of a varactor diode with a trimmer potentiometer. Because the frequency of LC based oscillators is very sensitive to temperature and aging and because the temperature in the car can vary by as much as 50° C. (the car left on the sun vs. car with air-conditioning on), the carrier frequency of these FM transmitters can drift by as much as 10%. Hence, FM transmitters require very frequent retuning, making them not very useful for in-car applications. These solutions also require a voice/music signal in analog domain or a Digital-to-Analog (D/A) Converter to convert a voice/music signal from the digital to analog domain in systems where voice/music is stored, processed and transmitted digitally.

SUMMARY OF THE INVENTION

In accordance with the invention the FM transmitter is implemented in digital domain all the way to the antenna from digital samples (voice/music/data). The carrier frequency can be selected in very fine steps (less than 1 Hz), and its temperature stability can be in the range from 0.0001% (1 ppm) to 0.002% (20 ppm) depending on the temperature stability of the crystal oscillator used to drive FM transceiver digital oscillator. The RF transmission power can also be adjusted digitally. This invention thus provides a fully digital FM transmitter, from voice/music digital samples up to the passive band pass filter preceding the antenna.

According to a first aspect of the invention there is provided a digital FM transmitter, comprising a digital controlled oscillator for generating a modulated RF carrier; a processor for receiving digital input samples and generating therefrom a modulating signal for input to said digital controlled oscillator; and a bandpass filter for filtering frequency components of said modulated carrier outside a predetermined frequency band and supplying said filtered modulated RF carrier to an antenna. The processor is typically be a digital signal processor, although a general purpose processor could be employed.

This invention can be used in hands-free car kit applications as well as in the other application such as MP3 players, desktop phones, where the user may wish to broadcast the voice/music, which can be received by any FM Radio receiver inside a premises or car.

Optionally, the output from the DCO can be passed through an analog phase locked loop (APLL) to multiply the frequency of the DCO output clock, if needed, and to attenuate spurs with frequencies 100 KHz or more from the carrier.

Another aspect of the invention provides a method of generating a frequency modulated RF signal comprising generating a carrier with a digital controlled oscillator; receiving input samples at a processor; generating a modulating signal in said processor; supplying said modulating signal to said digital controlled oscillator to modulated said carrier; and filtering an RF signal from the output of said digital controlled oscillator to supply to an antenna.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENT

In accordance with the principles of the invention, the FM modulation is performed by changing the center frequency of a digitally controlled oscillator (DCO) in proportion to the amplitude of voice/music digital samples. The rate of update of the center frequency of the DCO is equal to the sampling frequency of the voice/music signal—typically, the sampling frequency is 8 KHz, 16 KHz, 44.1 KHz or 48 KHz, but the transmitter can be used for any other sampling frequency. The carrier frequency can be changed on the fly, merely by changing the center frequency of the DCO with fine resolution. The resolution of the DCO depends on the number of bits inside the DCO. High accuracies equivalent to the accuracy of the crystal oscillator used to drive DCO can be achieved.

The output frequency of the DCO is then fed to a bandpass filter, which converts square wave FM signal to sine wave FM signal and then to a passive attenuator (to reduce the power of the transmitter) before being fed to the antenna. The DCO output frequency can be lower than the required FM Radio Frequency as long as the one of the odd harmonics of the DCO output frequency is inside the FM Radio band. This is possible because the DCO output clock is a square wave clock; hence it has main odd harmonics ($3^{rd}$, $5^{th}$, $7^{th}$ etc). The maximum voltage of these harmonics decreases with n where n is the harmonic number. Hence, this feature can be used to adjust the RF signal power simply by selecting which harmonic will be in the FM Radio Band. For instance, if the fifth harmonic of the DCO output clock is in the FM Radio Band, the transmission power can be increased by changing the DCO output frequency so that the third harmonics of the output clock falls in FM Radio Band. Analogously, the power can be decreased by reducing the output frequency of the DCO so that seventh harmonic falls inside the FM Radio Band.

Figure 1:
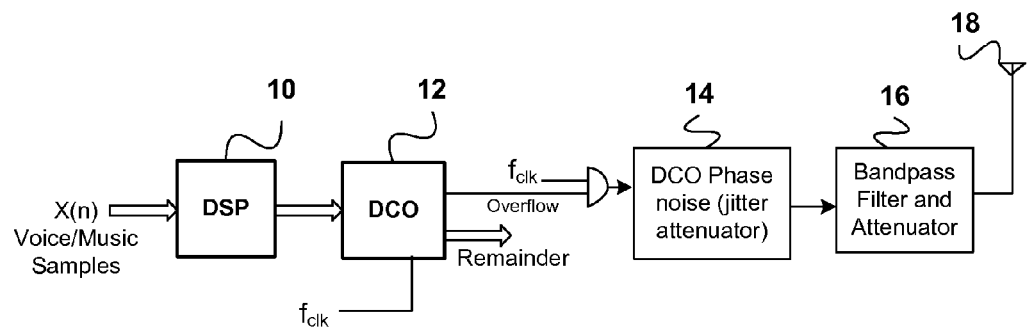
FIG. 1 is a top-level block diagram of a digital FM transmitter circuit, according to the preferred embodiment.

FIG. 1 shows an embodiment of a digital FM Transmitter, which comprises a digital signal processor (DSP) 10, which generates the modulating signal, a digitally controlled oscillator (DCO) 12, which modulates the carrier, an optional phase noise attenuator 14, which attenuates intrinsic phase noise generated by DCO 12, a passive and attenuator unit 16, including a bandpass filter, which filters components outside the required frequency band (For FM Radio this is from 88 MHz to 108 MHz), and a passive attenuator, which attenuates RF signal fed to the FM antenna 18.

Figure 2:
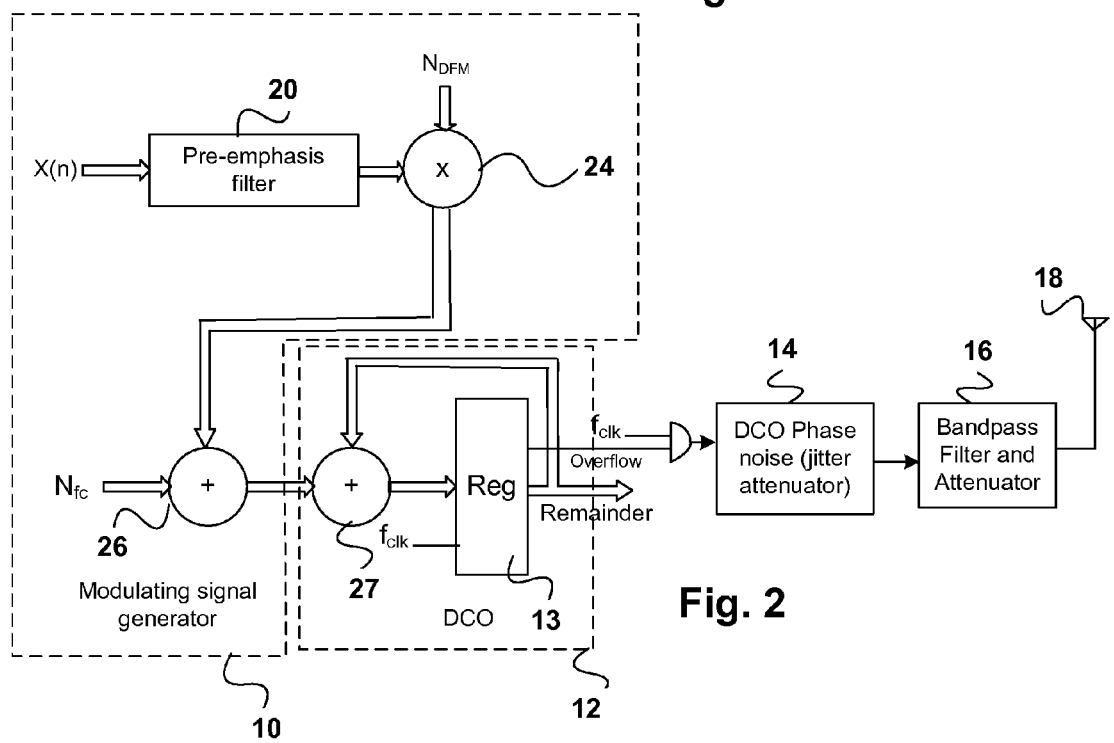
FIG. 2 is a more detailed block diagram of the digital FM Transmitter circuit, according to the preferred embodiment.

In FIG. 2, the DSP 10 includes a modulating signal generator 1, which is implemented in software. This receives voice/music digital samples and passes them through a pre-emphasis filter 20. This boosts higher frequency components of the modulating signal in order to keep signal to noise ratio of the FM signal constant. Frequency modulation has an inherent reduction of the signal to noise ratio at higher frequencies.

After the pre-emphasis filter, the signal is weighted in frequency deviation multiplier 24 by multiplying be the factor $N_{DFM}$. The output is added to the center frequency value $N_{fc}$ of the DCO 12 in adder 26 and then fed to an input of adder 27 in the DCO 12. The weighting factor depends on maximum frequency deviation for FM signal (75 KHz for broadcast FM radio) and the output frequency of the DCO 12. All these operations are done at the sampling rate of the voice/music signal (8 KHz, 16 KHz, 44.1 KHz or 48 KHz).

The weighting factor has to satisfy following equation:

$$f_c/D_{FM} = N_{fc}/(\text{max\_ampl} \cdot N_{DFM})$$

where $f_c$ is the carrier frequency, $D_{FM}$ is maximum frequency deviation, max_ampl is the maximum amplitude of the modulating signal (for 16 bit samples this is 0x7FFF), $N_{fc}$ is a number which specifies carrier frequency generated by DCO and $N_{DFM}$ is the number representing maximum frequency deviation.

Hence, $$N_{D_{FM}} = \frac{D_{FM} \cdot N_{fc}}{f_c \cdot \text{max\_amp}}$$

If the maximum frequency of the DCO output is lower than the required FM Radio frequency then $ND_{FM}$ and $N_{fc}$ have to be scaled down by the ratio of the required FM carrier frequency and the DCO output frequency.

As mentioned previously, the maximum DCO output frequency does not have to be in the FM Radio band (88 to 108 MHz) as long as one of the odd (or even) harmonics of the DCO output signal (The DCO output is squarewave signal) fits inside the FM Radio band. By selecting which harmonic will be placed in the FM Radio the FM transmitter, the output power can be adjusted because amplitude of the harmonics drops with ratio n where n is the harmonic number.

The frequency generated by DCO can be calculated from the following formula:

$$f_{DCO} = f_{CLK} \frac{N_{DCO}}{2^{DCO\_ACC\_WIDTH}}$$

where $$N_{DCO} = N_{fc} + N_{D_{FM}} x(n)$$

x(n) is the input voice/music digital signal, DCO_ACC_WIDTH is the width in bits of the DCO's accumulator 13 and $f_{CLK}$ is the master frequency of the DCO 12 as shown in FIG. 1.

The overflow output of the DCO has an average frequency equal to $f_{DCO}$, but its instantaneous frequency is not equal to $f_{DCO}$ because the DCO overflow output transitions are not aligned with ideal $f_{DCO}$ transitions, but with the master clock $f_{CLK}$ of the DCO. The instantaneous phase error of the DCO overflow output varies between the zero and the period width of the $f_{CLK}$ clock. Its value is numerically given by the DCO remainder value at the time of DCO overflow condition.

FIGS. 3A-3F show several different circuits that can be used to reduce the DCO inherent phase error. The simplest one (FIG. 3A), which comprises DCO12, bandpass filter 16, and antenna 18, just increases $f_{CLK}$ of the DCO.

The second solution uses an APLL 21 (analog phase locked loop) between the DCO 12 and bandpass filter 16 to filter phase noise outside the APLL loop bandwidth.

Figure 3A:
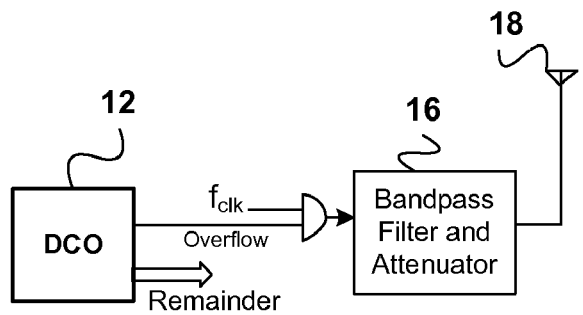
FIGS. 3A-3F are block diagrams of the various phase noise attenuation schemas that can be used to reduce phase noise generated by DCO.
Figure 3B:
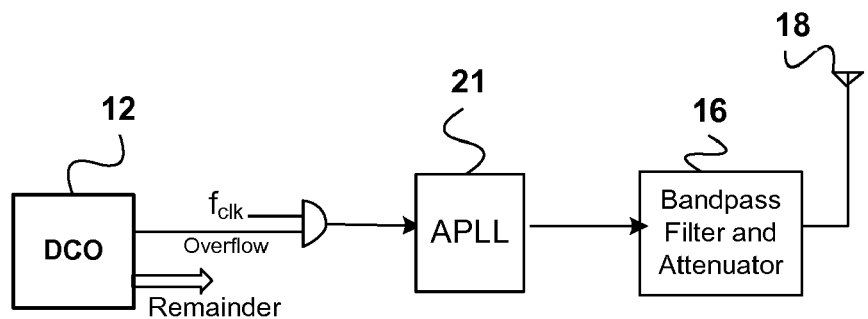
Figure 3C:
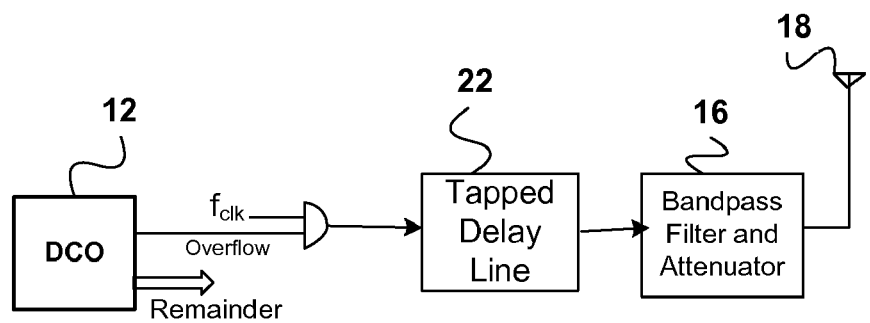

The third solution, shown in FIG. 3c, uses a tapped delay line 22 between the DCO 12 and the bandpass filter 16, which is controlled by DCO remainder as described in International Patent: PCT/CA95/00432, the contents of which are herein incorporated by reference. This permits the maximum phase error down to be reduced to the delay of a single delay cell in the tapped delay line.

Figure 3D:
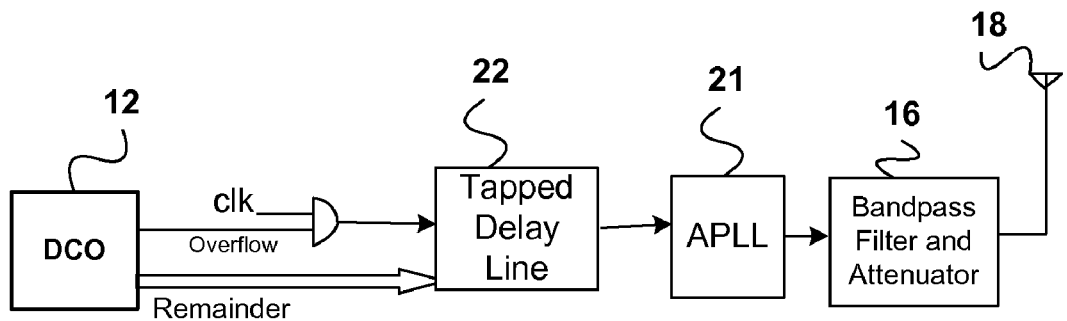

If the tapped delay line 22 is followed by an APLL 21, as shown in FIG. 3D, the jitter can be further reduced.

Figure 3E:
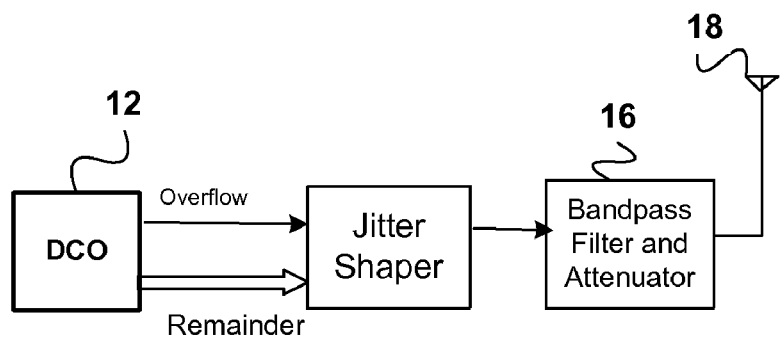

The fourth solution, shown in FIG. 3E, uses digital sigma-delta jitter shaper 25 as described in UK Patent: 0608202.8, the contents of which are herein incorporated by reference, between the DCO 12 and the bandpass filter 16.

Figure 3F:
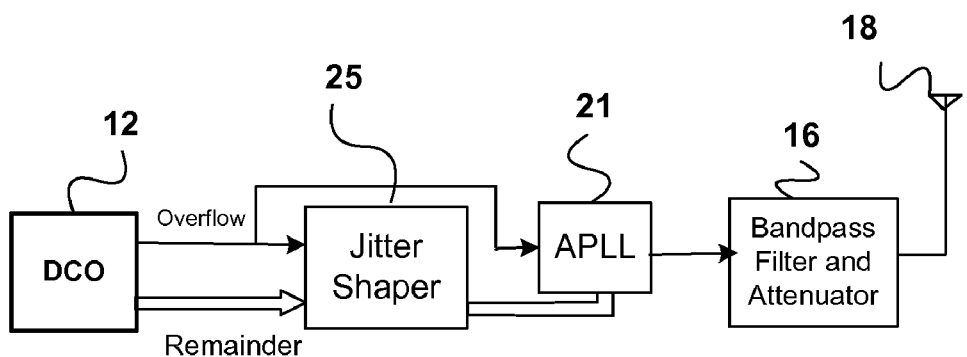

The fifth solution shown in FIG. 3F uses sigma-delta jitter shaper 25 (as described in U.S. Pat. No. 5,905,388, the contents of which are herein incorporate by reference, between the DCO 12 and APLL 21. The output of the jitter shaper 25 is used to control the division factor of the APLL feedback loop.

We claim:

1. A digital FM transmitter, comprising:
    a digital controlled oscillator clocked by a master clock at a clock rate $f_{CLK}$ and generating an overflow output signal at an average frequency $f_{DCO}$, where overflow transitions are aligned with the master clock and contain an instantaneous phase error determined by a remainder value of the digital controlled oscillator at the time of an overflow condition;
    a processor for receiving digital input samples and generating therefrom a modulating signal for input to said digital controlled oscillator whereby the overflow output signal of the digital controlled oscillator is modulated in accordance with said modulating signal;
    a phase noise attenuator for attenuating said instantaneous phase error from the overflow output signal; and
    a bandpass filter for filtering frequency components of the overflow output signal with the phase error attenuated outside a predetermined frequency band and supplying said filtered output signal as a modulated RF carrier to an antenna.

2. A digital FM transmitter as claimed in claim 1, wherein said processor is a digital signal processor.

3. A digital FM transmitter as claimed in claim 1, further comprising an attenuator for attenuating said RF carrier supplied to said antenna.

4. A digital FM transmitter as claimed in claim 1, wherein said digital signal processor comprises a pre-emphasis filter for boosting higher frequency components of the modulating signal.

5. A digital FM transmitter as claimed in claim 4, further comprising a frequency deviation multiplier for weighting the modulating signal by a weighting factor.

6. A digital FM transmitter as claimed in claim 5, further comprising an adder for adding said modulating signal to a center frequency of said digital controlled oscillator.

7. A digital FM transmitter as claimed in claim 5, wherein said weighting factor satisfies following equation:

$$f_c/D_{FM} = N_{fc}/(\text{max\_ampl}.N_{D_{FM}})$$

where $f_c$ is the carrier frequency, $D_{FM}$ is maximum frequency deviation, max_ampl is the maximum amplitude of the modulating signal, $N_{fc}$ is a number specifying the carrier frequency generated by the digital controlled oscillator, and $N_{D_{FM}}$ is the number representing the maximum frequency deviation.

8. A digital FM transmitter as claimed in claim 1, wherein said phase noise attenuator comprises an analog phase locked loop to filter phase noise outside a loop bandwidth thereof.

9. A digital FM transmitter as claimed in claim 1, wherein said phase noise attenuator comprises a tapped delay line controlled by the remainder of the digital controlled oscillator.

10. A digital FM transmitter as claimed in claim 9, wherein said tapped delay line is followed by an analog phase locked loop.

11. A digital FM transmitter as claimed in claim 1, wherein said phase noise attenuator comprises a digital sigma-delta jitter shaper.

12. A digital FM transmitter as claimed in claim 11, wherein the output of said jitter shaper controls the division factor of the feedback loop of an analog phase locked loop.

13. A method of generating a frequency modulated RF signal comprising:
generating an overflow output signal with a digital controlled oscillator clocked by a master clock at a clock rate $f_{CLK}$ and having an average frequency $f_{DCO}$, where overflow transitions are aligned with the master clock and contain an instantaneous phase error determined by a remainder value of the digital controlled oscillator at the time of an overflow condition;
receiving input samples at a digital signal processor;
generating a modulating signal in said digital signal processor;
supplying said modulating signal to said digital controlled oscillator to modulate the overflow output signal of the digital controlled oscillator;
attenuating the instantaneous phase error from the overflow output signal; and
filtering the overflow output signal with the instantaneous phase error attenuated to remove frequency components of the overflow output signal outside a predetermined frequency band to supply to an antenna with a modulated RF carrier.

14. A method as claimed in claim 13, wherein the overflow output signal of said digital controlled oscillator has a fundamental frequency outside the FM band, and said RF signal is obtained by filtering a harmonic of said output within said FM band.

15. A method as claimed in claim 13, wherein the gain of said RF signal is controlled by selecting which harmonic of the overflow output signal is located in the FM Radio Band.

16. A method as claimed in claim 13, wherein the digital samples are weighted prior to adding them to the center frequency of the digital controlled oscillator to generate said modulated carrier.

17. A method as claimed in claim 13, wherein said samples are pre-emphasized to boost higher frequency components in software prior to modulating said carrier.

18. A method as claimed in claim 13, wherein the phase error is attenuated by increasing the clock frequency of the digital controlled oscillator.

* * * * *